(No Model.)
N. J. CLUTE.
ELECTRO MAGNETIC BRAKE.
No. 376,709. Patented Jan. 17, 1888.
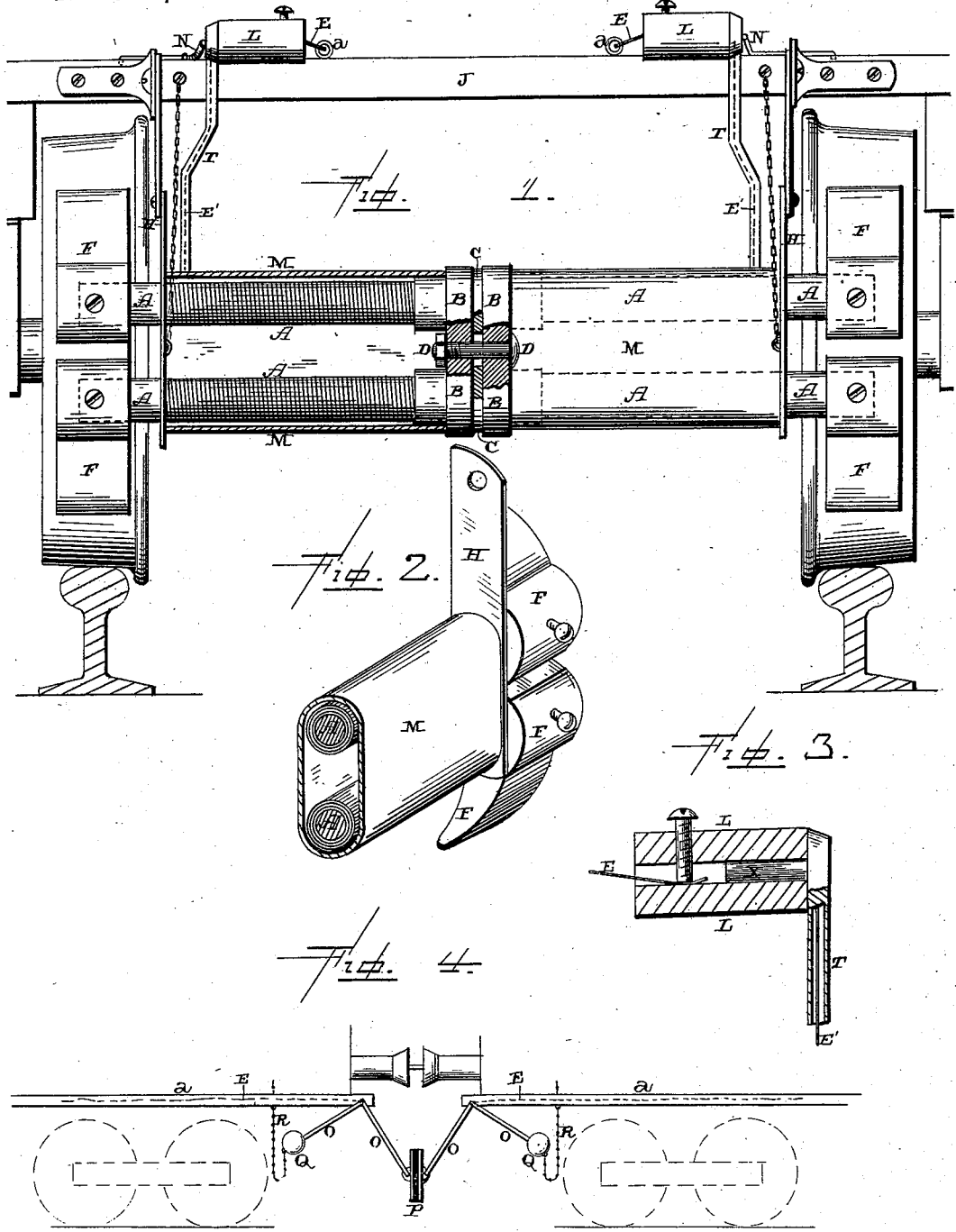

UNITED STATES PATENT OFFICE.

NICHOLAS J. CLUTE, OF SCHENECTADY, NEW YORK.

ELECTRO-MAGNETIC BRAKE.

SPECIFICATION forming part of Letters Patent No. 376,709, dated January 17, 1888.

Application filed October 26, 1887. Serial No. 253,461. (No model.)

*To all whom it may concern:*

Be it known that I, NICHOLAS J. CLUTE, of Schenectady, in the county of Schenectady and State of New York, have invented certain new and useful Improvements in Electro-Magnetic Brakes; and I do hereby declare the following to be a full, clear, and exact description of the invention, such as will enable others skilled in the art to which it pertains to make and use it, reference being had to the accompanying drawings, which form part of this specification.

My invention relates to an improvement in electro-magnetic brakes; and it consists in, first, the combination of two U-shaped magnets, both of which have each of their poles secured to a separate and distinct brake-shoe, the two magnets being magnetically insulated, but electrically connected; second, the combination of the truck-beam, the U-shaped magnets, and the hangers for the brakes with the pipes through which the wires pass and the sockets secured to the truck-beam; third, the arrangement and combination of parts, which will be more fully described hereinafter.

The objects of my invention are to use both the north and south poles of each magnet on each wheel, and thereby double the amount of power from the same amount of electricity, to provide a dust and water proof connection between the truck-beam and the brake, and to provide an automatic coupling for the cars through which the current of electricity will always freely pass.

Figure 1 is a side elevation of a brake to which my invention is applied. Fig. 2 is a perspective of one of the magnets, the two brake-shoes connected thereto, and a hanger for the brake. Fig. 3 is a detail view of the connection between the truck-beam and the brake. Fig. 4 is a side elevation of the electrical connection for the cars.

A represents the two soft-iron magnets, which are wound with insulated wire, and which have their inner soft-iron connections, B, separated from each other by a plate, C, of any non-magnetic material—such as copper—for the purpose of preventing the magnetism of one magnet from passing to the other. Passing through these two soft connections B is a suitable bolt, D, through which the current of electricity freely passes from one magnet to the other. In order to prevent any possibility of the wires upon these magnets A becoming injured, the magnets are each inclosed within a suitable shell or casing, M, which serves as a protector for the wires both from accidents and from wet, dust, and dirt. Secured to each pole of each magnet is a brakeshoe, F, which are entirely separate and distinct from each other, and the magnets and brakes are supported in position by the brass or wooden hangers H, which extend down from the truck-beam J. These hangers H are made of brass or wood, so as to magnetically insulate the brake-shoes from each other. By using two separate and distinct magnets, and having the poles of each magnet connected to a separate and independent brake-shoe, both poles of each magnet are utilized, and thus double the amount of power is exerted in forcing the shoe against the wheels from the same amount of electricity. Where long continuous iron bars are used as magnets in this connection, they each retain their electricity long after the current is shut off, and this I avoid by using two separate magnets which are magnetically insulated from each other, but electrically connected.

Secured to the brake-beam are brass sockets L, in which the upper ends of the brass pipes T catch, as shown in Fig. 3. The upper ends of these pipes T are made solid and provided with pins X, which catch in the sockets and form pivotal supports for the pipes. These pipes are prevented from working out of the sockets by means of suitable stops, N, which are secured to the truck-beam, as shown. The insulated conducting-wires E are connected to the sockets L in any suitable manner, and other wires, E', pass down through the hollow pipes T to the magnets. These pipes T serve as protectors for the insulated wires E', to prevent them from being broken or from becoming injured by moisture, dust, or dirt. The wire at one end of the truck-beam is made to convey the current to the magnets, and the wire at the other end serves to return it to the dynamo. These wires E pass along under the cars through suitable pipes, a, by which they are protected from all injury, and connection is made from one car to the other by the pivoted weighted cranked levers O, (shown in Fig. 4,) which are connected to the wires and pivoted upon the ends of the cars, and which have suitable connecting-plates, P, formed on their lower ends. The weights Q upon these cranked levers serve to keep the plates P always in contact with each other, and through these plates P and levers O the electric currents pass from one car to the other. By means of the chains R, connected to the weighted ends of the levers O, the levers can be drawn out of contact with each other at any time, should it be so desired, and at the same time the ends of the levers carrying the plates P can be moved back under the end of the cars out of the way. There will be two sets of these connecting-levers—one upon each side of the buffer—through which the currents from and to the dynamo pass.

I do not limit myself to any particular form of dynamo which is to be located upon the engine, nor to any particular form of switches, or other devices for controlling the circuits, as these form no special part of this invention.

I am aware that magnets connected together so as to practically form but one have heretofore been used as brakes, and magnetically insulated from the wheels, and this I disclaim. My invention differs from this in magnetically insulating the magnets from each other, so as to form separate and distinct magnets.

Having thus described my invention, I claim—

1. The combination of two separate and distinct magnets, which are electrically connected by a clamping-bolt at their inner ends, but magnetically insulated, an independent brake-shoe for each pole of the magnets, circuit-wires connected to the magnet-cores, and suitable supports for the magnets, the magnets being made to extend horizontally across from one wheel to the other, substantially as shown.

2. In an electro-magnetic brake, the combination of two U-shaped magnets, which are magnetically insulated, but electrically connected together, with a separate and distinct brake-shoe applied to the different poles of the magnets, and the non-magnetic hangers H, by means of which the shoes are magnetically insulated from each other, substantially as described.

3. The combination of the U-shaped magnets magnetically insulated from but electrically connected together, the separate brake-shoes, the non-magnetic hangers, the pipes T, the sockets L, secured to the brake-beams, and the conducting-wires, substantially as set forth.

4. The combination of the conducting-wires with the weighted levers pivoted upon the ends of the cars, and having their lower connecting ends provided with plates, substantially as specified.

In testimony whereof I affix my signature in presence of two witnesses.

NICHOLAS J. CLUTE.

Witnesses:
J. WARD SCHERMERHORN,
E. E. KINGMAN.